Patented Apr. 7, 1942

2,278,476

UNITED STATES PATENT OFFICE 2,278,476

ANIMAL PROTEIN MATERIAL

Albert Musher, New York, N. Y., assignor, by mesne assignments, to Food Manufacturing Corporation, Chicago, Ill., a corporation of New York No Drawing. Application September 13, 1941, Serial No. 410,737

5 Claims. (Cl. 99—107)

The present application relates to animal protein materials, and particularly to meats, fish, and poultry, and still more particularly to the edible muscular portions of these animal protein materials.

This invention is particularly applicable to foods such as meats, fish, and poultry which, in their original condition have a high moisture content as, for example, in excess of 35% to 50%, and which are of a relatively high fibrous nature.

In preparing meats, poultry, etc., for use or consumption, it is necessary to subject them to relatively long boiling or cooking periods in order to separate the fibers and in order to soften the flesh sufficiently to allow for proper masticating, digestion, and so forth.

Also, in view of the relatively high moisture content of meats, fish, and similar animal protein materials, they cannot be stored over periods of time without the possibility of spoilage due to fermentation, mold growth, putrefaction and similar deterioration, unless they are subjected to various protective systems.

Various methods have therefore been devised in order to protect these foods as much as possible against deterioration effects. Examples of these methods are refrigeration, dehydration, etc.

Of these two methods, refrigeration is a very expensive procedure, and dehydration also offers many disadvantages. For instance, dehydrated meats and fish are very difficult to prepare and cook because of the fact that in the dehydrating procedure as well as in the storage procedure that follows, there is a tendency for these foods to become quite tough, hard, and compacted and therefore they are quite resistant to the influence of boiling or hot water when they are ready for the cooking procedure.

This toughness or hardness or resistance against cooking or absorption of water is due, not alone to the natural hardness of the dried meats or fish, or the fibers therein, but in a great many cases this is due also to the resinous, pasty, or gummy materials, or to the connective tissues or sheaths that surround these fibers or that bind them together.

Aside from the inconvenience and difficulty in preparing animal protein foods from dehydrated products, there is also frequently lost, because of the long cooking or soaking procedures that are necessary, many of their flavors, essences, vitamins and other valuable qualities and characteristics.

It is therefore among the objects of the present invention to provide an entirely new type of animal protein foodstuffs, and methods and processes for preparing them, so that these improved animal protein foodstuffs may now be readily shipped, stored and merchandised with substantially reduced danger of spoilage by having them in a dry form, but also, at the same time, so that they will have a materially improved quick-cooking quality or quick-preparing quality not found in the usual dried or dehydrated fibrous protein food materials.

A further object of this invention is to produce fibrous animal protein products which have more digestible qualities than the ordinary dehydrated protein foods in that the body structure and cell structure is not compacted together and thereby is not toughened to the same extent as the ordinary dehydrated food materials.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by subjecting the meat or fish or similar fibrous relatively high water animal protein material to a new combination of steps comprising a dehydrating operation followed by an exploding operation.

In dehydrating the food materials of this invention, preparatory to the explosion procedure, they are subjected to any of the various drying methods, as, for example, to heat or to hot air, at such a temperature and for such a length of time so as to reduce their water content from above 35% to 50% and frequently from above 70% or 75%, to below 50% or 60%, or to a moisture content below 30% or 35%, or to a moisture content below 15% or 20%, or even below 10%, depending upon the type of animal protein material used, and the specific results desired.

This drying process should preferably remove the required amount of water content from the food products without substantially causing any change in the wholesomeness or unity thereof.

For various preferred embodiments of this invention as, for example, with reference to various cuts or types of meats, the moisture content should be reduced to the moisture content normally found in commercially prepared dried beef. Also, it is among the further preferred embodiments to further dry the commercially dried beef into what may be termed a superdried dried beef. This superdried dried beef may be prepared by further drying the commercially dried beef as, for example by placing the commercially dried beef into a tray dryer for a time period and at a temperature sufficient to further reduce the moisture content so as to result in a relatively harder, drier and tougher meat piece.

Depending upon the type of product desired, the type of product used, the amount of structure disruption, porosity, or fiber disintegration desired, the moisture content may be adjusted accordingly. For example, in the treating of various fish products in accord with this invention the moisture content may be adjusted to the moisture content normally found in commercially dried anchovies or, if desired, the moisture content may be further reduced to the moisture content normally found in commercially dried cod fish, where the dried cod fish is in a relatively very hard and tough condition.

The dehydrated material then containing its relatively reduced quantity of moisture is then subjected to an expansion or explosion procedure to soften, or separate, or disrupt the fibers, the cell structure, or the entire food structure, or to separate the muscular fibers from the connective tissues.

According to this procedure the dried food material is then subjected to a treatment at relatively elevated temperatures and pressures. For best results the pressure should usually be above 20 or 25 pounds per square inch and preferably should be above 40 or 50 pounds per square inch and in some cases it may run as high as 350 pounds, 400 pounds, or more per square inch.

Generally, the temperature should be above 250° F. to 300° F. and preferably within a range of about 350° F. to 800 F. The most preferred range is usually between 400° F. and 600° F.

This treatment is carried on for a time period and at a pressure and temperature depending upon a number of factors as for instance, the moisture present in the food product, the softness of the food product, the degree of expansion desired, the type of equipment use, whether external heat or steam or superheated steam is used, and similar other factors.

The required time for exposure may be 10 to 15 minutes or longer, or it may be around 5 or 6 minutes, or it may be less than several minutes. In many cases the best results may be obtained by adjusting the time period under one minute, as, for example, to several seconds or to 15, 30 or 45 seconds.

While the product is in the pressure chamber, the chamber may or may not be rotated as desired.

Also, the pressure and temperature within the chamber may be obtained by introducing saturated or superheated steam into the chamber, or, if desired, the chamber may be externally heated, in which case steam may be admitted to the chamber, or, the moisture content of the animal protein material may be so regulated that the moisture from within this material will generate the necessary pressure. For various modifications and results in carrying out this invention the steam may be moist or dry.

Also, if desired, for various purposes, water or other moisture materials may be added to the pressure chamber. These moisture materials may consist of, or may include fruit, vegetable, meat or other juices derived by extraction, expression or cooking.

The steam within the chamber may be controlled so as to maintain or change the moisture content of the food being treated so as thereby to obtain the best results.

Also, various flavoring materials such as salt or spices, for example, or other flavoring materials, either dry or liquid, may be admitted or placed in the chamber so as to become impregnated within the animal protein material during this treatment, or so as to otherwise modify the resultant product.

The amount of moisture withdrawn or removed before expansion or explosion should be such as to give the best results to carry out the expansion process. With a large number of food products it is preferred to reduce the moisture content of the foods to below about 40% to 50% or, for example, to between about 4% and 25%.

If the product to be exploded is a little too dry, additional moisture may be added to the product or to the expanding chamber, as for example, in the form of water or other aqueous material, or in the form of saturated steam or superheated steam.

After the treatment at the elevated temperature and pressure, the fish, or meat, or other animal protein material, is suddenly and instantaneously released to a low pressure (preferably relatively unconfined) area, such as the atmosphere. This sudden release is effected by suddenly and instantaneously opening the particular vessel in which these foods have been treated, whether such vessel be of the form of a pressure gun, or some other suitable apparatus.

After the meat or fish has been treated in accord with the process described herein, and ejected from the chamber by the explosive reduction in pressure, the texture, structure, or various characteristics thereof have been substantially changed. The conditions of temperature, pressure, time, and also the varying of the dehydration factors, etc., may be utilized to modify or adjust the size, porosity, softness, the flavor strength or the food essentials of the animal protein materials treated in accord with the present invention.

The meat or fish piece may, in many cases be increased in volume, as compared with the original dehydrated food piece.

These fibrous protein materials are now in a condition where their compact fibers have been to a large degree, torn, separated, or softened, or they are in a condition where a large number of passages and pores have been formed, many of which are greater than capillary size, and many of which are of a connecting nature. The increase in the surface area of the food, including the interior exposed areas, enable greater contact between the boiling liquid and the expanded food material so as to enable more rapid and improved cookability.

These passages and pores, and the increased water absorbent nature of the product, now permits water to more readily penetrate into the food piece particularly at elevated boiling temperatures. These new porous food materials may now be placed in hot or boiling water, and they will be very much more readily and more quickly cooked. There may now be eliminated the long cooking and long soaking procedures which have ordinarily been required in the case of dried fish and dried meats in order to produce the desirable characteristics of cooked meat or cooked fish as now produced with the improved product of this invention.

Also, because the water of the boiling medium has the opportunity of entering into the interstices between, and into the pores and openings of the exploded animal protein material, enhancement and development of more flavor apparently results. Still further, improved mastication and digestibility are produced by the loosening and separating of the compacted fiber structure.

Although this procedure of explosion disruption or expansion is carried out in one step, it may be also carried out in a plurality of explosion steps in which case the same, or different temperatures and pressures and time periods may be utilized. For example, the food material may be subjected to 1 or 2 or 3 explosion or expansion treatments of the character above described at temperatures varying from 250° F. to 400° F. and at pressures varying from 50 to 60 or 70 pounds per square inch, and for time periods varying from 15 seconds up to several minutes.

In many cases, for instance, a multiple expansion procedure at lower temperatures and/or pressures has advantages over a single explosion at a higher temperature and/or pressure, in that relatively less intense explosions may take place, but which, in the aggregate, will result in the cookability required, without the disadvantages of loss of flavor, excessive disruption of structure, etc., which may be produced by a single explosion at a high intense pressure and temperature.

Particularly is the multiple explosion procedure of advantage with reference to animal protein materials in view of the fact that the dehydrated compacted fibers of such animal protein materials are generally quite hard and tough and thereby they require considerable explosion in order to produce the desired porosity or the desired quickly cookable quality. In such cases, where the degree of explosion that is required, produces a burnt or scorched protein piece, a multiple explosion procedure may be utilized. For this purpose, two or more explosions may be used at temperatures or pressures or for time periods lower than the temperatures, pressures or time limits that produce the relatively high scorched or burnt food piece.

It is desirable at times to place a coating on or within the pieces of food products so as to permit the formation of harder walls and thereby so as to result in a greater or more efficient explosion of the product. Starch, resins, gums, and similar materials may be used to provide such a coating.

The food products treated with the explosion procedure of this invention may be ejected from the pressure chamber, if desired, into liquid oil or into molten fat, or into molten sugar, or into fatty or aqueous vapors, or into atmospheres of nitrogen, carbon dioxide, or other inert gases, etc. These embodiments may be used to aid in retention of flavors, or in the retarding or elimination of discoloration, oxidation, etc.

Also, where desired, the meats, poultry, or fish, etc., may be powdered or pulverized, after this process, and then if desired they may be dipped into or coated with a plastic or molten fat, or various sugar syrups etc. to retard discoloration or oxidation or to provide a bound or briquetted product.

The various fish and meats, etc., that are treated by the dehydration and explosion treatment of the present invention may be advantageously cooked because of the fact that they do not immediately sink to the bottom of the vessel to the same extent as untreated dehydrated animal protein foods. Because of their relatively spongy quality, when sufficiently exploded, they float to an extent during the cooking operation and do not sink so quickly to the bottom of the pot and thereby they do not burn so readily.

The sponge-like structure of these various food products has an important advantage in that the porous structure may be used to absorb various types of flavors or essences such as vegetable extracts or flavoring solutions, and these flavors and essences may subsequently be dehydrated or dried within the expanded food piece.

The meat, fish or other animal protein pieces which are obtained after explosion, may be coated, impregnated, or otherwise treated to render them less susceptible to oxidation or deterioration, or to aid them to retain therein, moisture, flavor, and softness of the fibers, and so as to enhance the quality of being more readily cookable.

After the explosion procedures herein outlined, the resultant foodstuff may be coated, impregnated, or otherwise protected with protective materials and particularly with water repellent materials such as oils or fats (in molten form), and preferably with fats which are in a plastic or hardened condition at room temperature. However, under various conditions, various other materials or combinations thereof may be used for impregnation, coating, etc., as for instance, sugar, preferably when it is of a quickly dissolvable nature.

In some cases an oil-in-water emulsion or a water-in-oil emulsion, but preferably a water-in-fat emulsion, may be used as the protective coating for various food pieces, particularly where briquetting is to be one of the results. An example of a water-in-fat emulsion consists of an emulsion or emulsion-like product of a sugar syrup mixed with a molten hard fat which is then mixed until the hard fat congeals sufficiently to hold the sugar syrup in emulsified form. This material may be used for coating as well as for binding purposes.

Examples of fats or oils that may be used in the various embodiments of this invention are the vegetable stearins such as cocoanut oil stearin, cotton oil stearin, palm kernel stearin, etc., hydrogenated cottonseed oils, animal fats, olive oil, corn oil, peanut oil, sesame oil, lard, oleostearin, or other fats or oils, hydrogenated or natural, etc., or combinations of these or other fats and oils, etc. Mineral waxes, paraffin, etc., may also be used in certain cases for specific admixtures or applications, although in edible products, the use of these materials are generally desirable only in small amounts.

The fat that may be used for impregnation into the exploded piece or for coating, etc., may be the fat that was cut away, melted, or otherwise separated from the animal protein piece as herein described.

Fats of a hardened or plastic nature, such as those described above, may also be used where required as binding agents, where it is desired to form the food materials of this invention either by themselves or in conjunction with other food materials, into cakes, briquettes, or other food units.

Preferably, however, when the food materials of this invention, either with or without other food materials, are formed into such food units, for the purpose of resulting in a quick cooking food briquette it is preferable to use as the binding agent, binders which will not readily cake or harden, but rather binders which will very quickly disintegrate and melt or dissolve, etc., so as to provide for quick disintegration of the food briquettes or units and thereby so as to promote quick cookability. The preferable binders for this purpose are plastic, or preferably hard fats, and sugars, either alone, or in combination with each other.

Where sugars are used, they should preferably be of a non-crystallizable nature, or when crystallized, they should be in the form of small crystals with passages and pores throughout, so as to enable quick dissolution, or the sugar may be combined with other materials such as glycerine, etc., in order to produce water retaining, or non-crystallizable quality.

For the purpose of briquetting the various food materials of this invention, the various binder materials that are used may be used separately or may be combined in order to produce the best results. For example, an emulsion of the molten hard fat and the sugar syrup may be made where required. Also, if desired, and particularly where hygroscopic materials are present, the molten hard fat may be used as the protective coating for the hygroscopic materials (which combination is then congealed on the food piece), and then a sugar syrup may be used as the binding agent, so that the aqueous nature of the sugar syrup does not affect the water absorbent qualities of the hygroscopic material.

Still further, where desired, the molded food unit, which is bound by a sugar syrup, and in which the pieces have been coated with a fat- or wax-like water repellent material, may be placed into a temperature above the melting point of the water repellent material so as to form laminations, etc., and so as thereby to form a more durable food unit, after the molten water repellent material therein has been allowed to congeal.

The advantage of having food pieces which have pores, or passageways, is that, particularly as far as briquetting is concerned, these pores or passageways act as a good medium for anchoring the binding agent within each piece, and thereby forming a more substantial food briquette.

When molten hard fat is used either as a binding agent or as a protective, it is sometimes desirable to add this molten hard fat at higher temperatures as for instance 200° F. to 240° F., or higher so as to get a more complete fat coverage. Also in some cases, immediately after adding the molten hard fat, the product may be given a quick chill so as to congeal the hard fat as quickly as possible and thereby so as to get as thorough a coating as possible of the hard fat upon the surfaces, and within the interstices and pores of the food pieces. Also in some cases the food material may be kept for a length of time in the molten fat at the higher temperatures.

In various cases, fat of various melting points may be used at different stages in the operations of impregnation or briquetting or coating, as, for instance, a molten hard fat with a melting point of 100° F. may be used for the purpose of impregnating the food pieces and forming them into a briquette and a molten hard fat of a melting point of, for example, 120° F. may be used to coat the finished briquettes. This procedure may be utilized, for instance, where it is desired to give more resistance against atmospheric temperatures on the outside of the briquette, and also to result in a quicker disintegration of the food brick when placed into hot water for cooking.

As noted herein, where it is desired to include hygroscopic materials, such as powdered milk, etc., in a food brick, particularly in conjunction with food pieces which are then treated with aqueous binders or materials such as glucose syrup, etc., the milk powder or other hygroscopic materials may be coated with a molten hard fat, wax, or other similar water repellent material so as to avoid contamination of the hygroscopic materials with the aqueous nature of the binder.

In the making of food briquettes, it may be desired to enhance the cooking qualities of the food briquette by aerating the food, by whipping air or inert gases into the fatty material or into the other materials that are used for binding agents, or by otherwise introducing air into the brick.

Also mixtures of dry effervescent materials such as sodium bicarbonate and tartaric acid may be mixed into the food briquettes so that when the briquettes is cooked, the effervescent agents will combine to form a gas which will result in the food unit rising to the surface of the water so as to enable quicker and more effective cooking procedure.

Also, the inclusion of effervescent materials within the briquette may be utilized to provide for more ready disintegration of the briquette upon cooking, in view of the fact that the effervescent materials, upon coming in contact with water, tend to push the various food particles apart so as to permit quick disintegration, and thereby so as to retard the development of lumpiness or caking.

The products treated under this invention should first be sufficiently dehydrated before they are exploded, in order to produce sufficient body and strength so as to withstand the explosion process, generally without substantial disintegration and so as to retain substantially their unity in structure.

Also, in the explosion or dehydrating processes, it is quite frequently desired to use lean meat or fish, etc., or to cup away, melt out, or otherwise separate as much of the fat as possible therefrom so as to reduce fat oxidation, the melting of the fat, and other disadvantages in these processes. Where desired, this fat which has been separated from the flesh may be replaced after these procedures, and particularly after explosion, by impregnation, coating, etc.

In the carrying out of this invention it is preferable to use relatively lean or relatively low fat or non-fatty muscular tissue. Particularly the fleshy portions of the animal protein materials, such as cuts of steak, roasts, etc., should be utilized in carrying out this invention.

Also, in the carrying out of this invention it is particularly desirable and preferable to use animal protein materials which are of a non-fried or of a relatively more pliable quality or which are of a relatively non-friable quality or which are of a quality that permits some elasticity or some bending without breaking. In the utilization of fried or friable materials there is a tendency for these products to be shattered and disintegrated into disunified particles in the explosion operation whereas the purpose of the procedure outlined in this application is more generally to produce an animal food piece which is not shattered into a powder or into a disunified mass of particles but rather, the purpose of this procedure is to produce an animal food piece in which the dry fleshy muscular tissue is expanded, loosened, torn or separated so that in the cooking operation the water of the boiling medium may more readily enter into the food piece so as to provide substantially quicker cooking qualities than heretofore possible with dehydrated animal protein materials. In general, it is preferable to use for the carrying out of this invention a product that tends towards a relatively softer or more flexible quality rather than a product that tends more towards a fried or brittle quality.

In view of the fibrous nature of the products of this invention, it is advantageous to cut them before dehydrating and explosion, or before explosion, so that the interior portions of the meats and fish will be more exposed, and so that these materials will be in relatively smaller pieces. The resultant product will have enhanced cookability in view of the fact that there will tend to be formed more widely distributed pores and exploded portions.

The resultant product that is produced as the end product of this invention, may be of various moisture contents, but it usually has been found that it is preferred to have at least 2% to 3% of moisture in the final product or to have above 5% to 8% moisture in the final product so as to enable more ready cookability, which is not readily available when the product is entirely dried out. This also has the advantage of enabling the retention of at least some of the water soluble flavors, so as to enhance the flavor element.

Aside from the dehydration and explosion procedures that are used, as disclosed herein, various methods of enhancement may be used in conjunction with this explosion process. For instance, there may be used operations involving soaking or boiling the meat or fish in aqueous materials, freezing, cooking, steaming, ageing, or using enzymes, digestives, etc., which processes may be used singly, or in various combinations.

These procedures may be used at various points, as for instance, preliminary to, after, or as an accessory to the explosion operation, so as to further soften the fibers and enhance quick cookability.

As a possible embodiment of this invention, the meat or fish material may be cooked or steamed, so as to rupture or soften the fiber or cell structure of the food material, and then this food material may be dehydrated to a sufficiently low moisture content so as to enable the proper expansion or explosion operation.

It is preferable in carrying out this embodiment of this invention to control this precooking process so as to retain as much as possible of the water soluble flavors and other flavors, essences and qualities of the food product. This is usually done by such methods, as, for instance, cooking or steaming under vacuum, or under pressure, etc., or in the presence of inert gases such as carbon dioxide, nitrogen, etc. Also, if desired, the product may be cooked in a high concentration of its own juice, or other aqueous materials may be used instead of water, for this boiling procedure. Also if desired a waterless cooker may be used for this cooking operation.

It is generally desirable however, that, at the end of the cooking operation, no free water or at least a very small amount of free water remains, because it is obviously desired that as much of the flavor of the food product as possible be retained or re-absorbed back into the food, rather than have it in the exterior aqueous material. However, if any excess aqueous material remains, it may be dehydrated if desired and the dehydrated material placed along with the food product in order to enhance the food flavor.

This cooking operation may be carried on for such a period of time so as to produce the required softness, and generally it is preferred to continue this cooking or steaming operation to the point that the product is in a relatively soft condition.

Aside from cooking and steaming, other methods of cooking as, for instance, induction heating, may be used under conditions of various pressures and temperatures, or in conjunction with other cooking or steaming processes.

In the various cooking treatments that are herein described, the water should be present, preferably in sufficient amount so as to be substantially throughout the entire food, and preferably it should be distributed as uniformly as possible so that in the cooking or steaming operation, the entire structure of the food will be affected.

Various repeated cookings may be used to enhance the procedure herein described, or combinations of various cookings, at various temperatures, and under various conditions of vacuum, pressure, etc., in varied sequence, may be used if desired in order to produce the desired amount of softening, or fiber, body or cell disruption.

Following this cooking procedure, the food materials may be dried, or they may be otherwise treated, as required, preparatory to explosion.

Another embodiment of this invention that may be used in order to enhance the quickly cookable quality of the fibrous meats and fish, is to subject these food materials to a freezing operation, and particularly to a slow freezing operation, so as to rupture the cells, or soften the fiber and cell structure of the materials.

Animal protein material such as for instance, fish, poultry, or meat, etc., comprises a number of small elastic or flexible-walled cells. The fluid that is contained within these cells, or water that is added to the food piece, can be frozen so as to produce relatively large ice crystals. These ice crystals are produced not only in the cells or fiber itself but also in the space between the cells or fibers, and these ice crystals begin to form, as the temperature is lowered below 32° F. As the temperature is slowly reduced the ice crystals will become larger and will thereby break or rupture the cell and body structure of the food piece. This thereby results in a fish or meat piece, which, particularly when dried, and exploded, will be relatively more water absorbable, and therefore more quickly cookable.

In subjecting these food materials to a freezing operation, the amount of moisture, and the temperatures that are required in order to produce the best results may vary depending upon the degree of softening and rupturing of the cell structure that is required, or upon the nature of the food materials being treated, etc. The moisture content should generally be over 30% to 40%. For best results, the freezing should take place slowly at temperatures ranging between 0° F. and 32° F., although in many cases preferred temperatures may run down to minus 20° F. and minus 40° F. and lower. Varying temperatures may be used for varying lengths of time.

In general it should be said that it is desirable to carry out the freezing treatment in such a way that there will not be the formation of small fine ice crystals with the consequent lack of rupture of the cells and structure, but rather that there should be the formation of relatively large ice crystals sufficient to puncture, break, rupture or disrupt the cell structure, the fiber structure, or the food structure, substantially throughout the body of the particular material being treated.

The freezing usually takes place at ordinary atmospheric pressure but it may take place under conditions of pressure or vacuum.

The water content in the foods should be present in sufficient amount so that it is carried substantially throughout the food, and preferably, it should be as uniformly distributed as possible, so that when the freezing operation takes place, the entire structure of the food piece will be affected.

It is preferred to have the water present not only in its relatively free form in the fibers and structure of the food, but also within the cells, or in bound water form. It is usually quite preferred in this embodiment of this invention to treat the food materials by cooking, steaming or similar operations prior to the freezing operation so as to soften, break, or burst all or a good part of the cellular and/or fiber structure of the food pieces. In this manner, as much of the bound water as possible is released, so that the cell walls are broken wherever possible, and also so that additional softening of these fibers may take place previous to the freezing operation.

In accord with the procedures described herein, the bound water which is contained within the cell structure may be utilized for the purpose of breaking the cell walls so as to soften this structure and so as to facilitate entrance into the cells, of the cooking water, whereas the relatively free water between the cells and fibers may be utilized for the purpose of disrupting and separating the fibers and body structure so as to enable the easy entrance of the cooking water between the fibers, and thereby so as to enable quick cooking characteristics.

As a general rule, in the slow freezing operation, the temperature may be lowered gradually, slowly, or in steps, to temperatures below 32° F., or if desired there may be a relatively faster decrease in temperature say to 20° F. or 25° F. and then this temperature, after a period, may be decreased further.

Sudden changes in temperatures from higher, to lower, to higher temperatures, etc., with repetition, and with heat, as required, may be utilized to provide thermal shocks to produce or enhance cell and structure disruption.

As one procedure, for example, which may be readily applied to various kinds of meats and fish, etc., the temperature may be suddenly lowered from 32° F. to 25° F. and kept there for a period of time from one to two hours. Then the temperature may be gradually lowered to about 15° F. and maintained there for a period of two or three hours, and then a further treatment at 0° F., may be given. Following this, the freezing operation will be complete, if the cell structure is sufficiently broken, or longer periods of time may be required at various temperatures. Of course the size of the food pieces and similar factors should be taken into account in determining the temperatures and time periods to be used.

If desired, depending upon the character and degree of the structure softening or disruption that is required, the meat or fish material, during the freezing operation, may be permitted to come back to 32° F. or higher temperatures, so as to melt all or a good part of the ice crystals, and then, this material may be subjected again to a freezing procedure. This may be repeated one or more times, as required.

Where there is insufficient water in the cells or fiber structure, or where it is desired to enhance the disruption of the cells or structure, even when the foodstuff contains relatively high percentages of water, it is often desirable to force even more water into the cells so as to burst or soften the cells, or so as to enable, during the freezing operation, the formation of ice crystals in the relatively free water that is outside of the cell structure. This further absorption or enhancement by additional water is accomplished by steaming, cooking, and other similar procedures, under pressure, vacuum, or room temperature, or by various similar methods. Permitting the product to cook or steam in its own juice offers new advantages in flavor and other characteristics.

Various repeated cookings may be used to enhance this procedure, or combinations of various cookings intermingled with various freezings, in varied sequence, if desired, may be used in order to produce the desired amount of softening, or fiber or cell disruption.

Following this freezing operation, the food materials are then dried, or are otherwise processed, as required, preparatory to explosion.

In view of the fact that relatively large ice crystals are formed in this freezing embodiment, it is advisable, in thawing these products, to thaw them relatively slowly, and rather completely, before drying them or cooking them, or otherwise processing them. If these frozen food pieces are thawed quickly, there apparently is a tendency for a part of the juice and flavor which they contain to seep out, part of which may be lost, whereas if the thawing is allowed to proceed slowly, a fairly good part of this seepage material may be re-absorbed by the food pieces.

For the drying procedure of the various embodiments of this invention, it is desirable to carry out the drying in such a way that the food materials will oxidize as little as possible. For this reason the drying may be carried out, if desired, under vacuum, or in an atmosphere of carbon dioxide or nitrogen, or in other inert atmospheres.

The drying temperatures may vary, for example, from 80° F. to 212° F., or more or less, depending upon whether vacuum is used, the degree of dryness that is required or the general characteristics of the food material that is being dried, or depending upon other results or characteristics desired. However, for most purposes the usual drying procedures are adequate.

Instead of drying the food materials in a dry heat, at the various points throughout the procedures as described herein, these food materials may be placed into a liquid oil or into a molten hard fat and dried to the required moisture content, being careful to keep the fat or oil at a sufficiently low temperature, or to otherwise adequately control the conditions so that the food material being treated does not become fried or brittle or friable but so that it retains its relatively flexible, or not easily breakable quality. The molten hard fat in which the food materials are boiled or dried may be allowed to congeal, particularly by quick chilling, so as to immediately harden around the food pieces and thereby so as to act as a water repellent in order to keep as much moisture as possible within the food pieces, and also so as to more fully retain the softness of the fiber structure.

Of course, if desired, the dehydration factors may be adjusted or utilized before or after explosion, or the explosion factors of temperature, time, and pressure, etc., may be adjusted so as to produce an animal protein material that is in a friable condition or so as to produce a material in which the fibers are in a relatively shredded, either unified or disunified, condition.

Still further, the exploded animal protein material, as, for example, exploded superdried dried beef may be further dried, if necessary, after explosion, and may be ground or powdered so as to produce a powdered meat or fish or poultry product with new and enhanced qualities of water-wettability, water suspensibility, water absorption, etc., particularly when mixed with hot water for forming soups, beef drinks, etc.

Although the usually preferred procedure, generally, in the carrying out of various embodiments of this invention, is to first cook or steam if required, and then freeze, if required, and then dehydrate and expand or explode, nevertheless, depending upon the conditions available, the result that it is desired to accomplish, the characteristics and fibrous quality of the food, and other considerations, this sequence may be varied as required. Also various of these operations may be repeated as required.

For example, the food may first be dehydrated and exploded, so as to expand or disrupt the structure, and then it may be re-hydrated, and then cooked or steamed, and frozen, if desired, and then dried again with another explosion procedure, as required.

By utilizing the embodiments of freezing, cooking, steaming, or enzymic action, as described herein, in combination with the explosion process, different, and in many cases, much more acceptable products may be produced than is produced with an explosion process alone.

In fact, in many cases, a considerably less intense explosion may be given to the food pieces of this invention, in view of the fact that the structure of the food piece has been to a large degree softened or disrupted by the use of freezing, cooking, or the other procedures. Thereby, the explosion procedure is required primarily for the purpose of expanding or opening up the food pieces, so as to more quickly permit the quick entrance of water into the structure thereof, rather than for the purpose of fiber and cell disruption.

Furthermore, in the process of violent explosion, there is not utilized the slow cooking, or slow fiber softening quality such as is produced when the cooking operation, for example, is used in conjunction with a less intense explosion or expansion. These slow cooking or pre-softening procedures are quite important with many foods in order to produce properly cooked foods.

In the cooking or freezing procedures, or separately from these procedures, various concentrations of salt and/or sugar, etc., may be used in order to produce various curing effects, for the purposes of preservation, or softening, etc. Also pickling, smoking, or other food procedures may be utilized as required.

With reference to curing operations in conjunction with the animal protein materials of this invention, the explosion procedures herein described may be utilized in that this explosion opens up the structure of the food material and thereby enhances the curing operation by providing quicker and more thorough penetration and curing.

In the embodiments of this invention, the processes that are used should preferably be regulated, where possible, as that the end product, upon being cooked by the consumer in the usual cooking or boiling routine, will retain substantially its unity and will not result in a mushy or disintegrated mass.

Although explosion, as described herein, is utilized mainly in conjunction with the meat, fish or other animal protein pieces after the high amount of moisture has been reduced from them, nevertheless, this explosion may take place while the food retains its full, or a relatively high moisture content. This type of explosion may take place before, after, or in conjunction with the steaming, cooking, freezing or other operations, or this explosion may be given to the food while it is in its raw state prior to any cooking, steaming, or freezing, etc.

The purpose of this type of explosion is different from the explosion procedure mentioned herein wherein the product is first dehydrated. The procedure heretofore mentioned, which takes place with a product of substantially reduced moisture content, results in an expansion of the product, so as to produce a dry relatively expanded or relatively porous material. However, the purpose of this present outlined procedure, with the high water content present, is rather to tenderize the structure of the food piece, rather than to produce a dry, expanded, porous, or very quickly water-permeable product.

Of course the temperature, pressure, length of time, etc., are explosion factors that should be adjusted in this operation so as to aid in providing these moisture-containing food pieces which will not result in a more or less disunified, soupy, or shredded mass but will result in a relatively tenderized product that retains substantially its unity.

Because of the fiber-weakening and tenderizing of this explosion process in conjunction with high water content foods, these foods, whether they be meats, fish, or poultry, etc., or even whether they be many other non-protein or low fiber foods, may be treated with regular dehydration or quick-freeze processes so as to produce substantially enhanced products in their subsequent dehydrated or quick-frozen form.

By the use of an explosion procedure with these high water content foods, as herein described, particularly at lower ranges of temperature, pressure, and time limits, and particularly in conjunction with substantially fibrous foods, as for instance, meats, where there is relatively little, or no disruption of the cell structure when these relatively large amounts of water are present, but where there is a tearing away or loosening of the fiber structure, enhanced tenderized qualities may be produced. Aside from tenderizing the meat for normal consumer use this process may be utilized in producing a quicker quick-freeze operation and an improved product, in view of the prior softening or loosening of the structure of the food material.

The explosion procedure, however, for the general embodiments of this invention, is used primarily in conjunction with animal protein materials that have first been dehydrated to the relatively low moisture contents, as described herein.

At various points throughout the various procedures outlined herein, enzymes, ferments, or digestives, and particularly proteolytic enzymes, and enzymes of the nature of trypsin, pepsin, papain, etc., may be utilized for the purpose of aiding in softening or preparing the meat or fish piece so as to enable quicker cookability.

It is generally of advantage to dehydrate and explode or expand the meat or fish, etc., before treating it with enzymes or digestives, although this is not altogether necessary. This treatment with the enzymes may then consist of placing the food into an aqueous medium containing the enzyme. After the expansion process, the digestive medium is better enabled to get within the structure of the food piece and thereby to more readily and more completely affect the food. The enzyme action may be stopped at whatever point is required, as for example, by heat, or other known methods. Also this digestive modification may take place before or after the cooking process, or the freezing process, or at various other points in the procedures of this invention, and the product may then be dehydrated, and then again exploded, or further treated, as required.

A still further embodiment of this invention that may be used in conjunction with the explosion procedures herein described, and with or without the accessory operations, as for instance, freezing, cooking, curing, enzymic action, etc., is the use of various rays, such as ultra violet light rays, kindred to X-rays. The use of these rays in conjunction with the animal protein materials of this invention enables the meat to age at warm temperatures, whereby the enzymes may work so as to tenderize the meat, and whereas, at the same time, the use of these ultra violet light rays act to destroy, or keep micro-organisms from developing. Following this procedure, the meat may be dried and then exploded, as herein described, or the freezing, cooking, or other procedures may take place in conjunction with this ray-ageing treatment.

Another possible embodiment with reference to the products of this invention is to immerse them into water, or into other aqueous materials, or into hot or cold brine, after they are dehydrated and exploded, and then to freeze them therein.

A further utilization of this invention is in conjunction with extraction and expression procedures. For example, beef juice may be prepared by expression from the dehydrated and exploded meat, prepared as herein described. Of course, in such extraction or expression procedures, there should be added or mixed with the dry exploded material, a water or oil medium, depending upon the solubility of the elements to be extracted. This medium may be so utilized to re-dissolve the flavors and essences that are contained within the food piece so as to enable expression of the elements therefrom in a liquid form.

The products utilized in this invention are not only of a relatively low starch content, but also of a relatively low sugar content. This low carbohydrate content enables several advantages, among which is the advantage that, after the explosion procedure, there is not the burnt sugar or caramel-like off-flavors that result in foods containing relatively higher sugar content. Also, after the explosion, there is not the exploded starch formation that occurs in food products containing substantially higher amounts of starch. This low starch content of animal protein materials eliminates the collapsible quality that is found in a high starch food product when it is placed in water or cooked with water.

This relatively non-collapsible quality of the food pieces produced in accord with this invention is further augmented by the relatively high fiber content of these food materials, which produces a more enhanced form-sustaining quality.

This more fibrous quality of these food pieces enables their being subjected to substantially higher and to a substantially more violent or more severe explosion, or to more explosions, so as to produce substantially improved quick cookability, without the disadvantage of loss of unity, etc., that would ordinarily be expected in the food piece.

In many cases also, depending upon the procedures used, the nature of the fibrous animal protein materials of this invention is such, that the fibers may be separated and pulled away from each other, and loosened, rather than having their cell structure substantially broken down, or exploded open.

These new qualities are produced in the animal protein food pieces treated in accord with this invention by utilizing the structure of these materials, as for instance, by utilizing the type and nature of the muscular and fibrous structure, and their connective tissues, etc. For instance, in the usual animal protein pieces treated in accord with this invention, the fibers are bound together in bundles or groups, or they may be in the form of strong individual fibers, etc. Also, in many cases, the striated fibers are cross-striated. Further, the fibrous intramuscular tissue consists largely of muscles of very fine fibers, and in this there are found nerves and blood vessels, etc.

Furthermore with reference to the connective tissues, these, in many cases, are made up in various proportions of connective tissue proteins including particularly collagen and elastin. Both of these substances are generally quite tough and are practically insoluble in cold water.

Also, the single polynuclear cell of the muscle fiber is covered by an elastic membrane and contains a material called muscle plasma that is composed of a solution of protein, etc., and which is in a relatively heavy or viscous state.

The structure of the cell from animal life is considerably different from the cell from plant life. For example, the cell of plant origin is generally enclosed in a cellulosic, relatively rigid membrane whereas in a cell from animal life there is generally absent such a cellulosic membrane but in its place is a delicate relatively elastic membrane. Also, animal materials generally contain considerable portions of protein and are rather low in carbohydrates whereas vegetable materials are generally rather rich in carbohydrates and usually, low in protein.

*Example I*

Beef that has been dried to produce commercially dried beef is cut into approximately ½ inch to ¾ inch cubes. These pieces of dried beef are placed in a closed chamber and saturated stream is allowed to enter into the chamber so as to build up as quickly as possible a pressure of 75 pounds per square inch at a temperature of about 320° F. The pieces of beef are kept in the chamber under these conditions for a period of 1 minute and immediately thereafter the chamber is suddenly opened to the atmosphere so as to result in an instantaneous drop in pressure, and ejection of the meat pieces.

If it is desired to produce a meat piece in which the fibers are still further pulled apart, various other time periods, as, for example, 3 minutes or 4 minutes, may be used.

*Example II*

Pieces of commercially dried beef with a moisture content of about 50%, are treated in accord with the procedure described in Example I except that they are cut into 1½ inch cubes and are treated in the pressure chamber at a pressure of 140 pounds per square inch, at a temperature of about 360° F. for a period of 4 minutes.

*Example III*

The commercially dried pieces of beef utilized in Example I are treated in accord with the procedure described in Example I except that the steam pressure is 215 pounds per square inch, the temperature is about 395° F. and the time period is 30 seconds.

If it is desired to produce pieces in which the fibers are further pulled apart or pieces of a softer or more tender condition, the time period may be, for example, 1 minute, or 1½ minutes, or longer.

A further variation is to utilize the procedure described in this example except that the time period is 3 minutes and the meat pieces are in 1½ inch cubes.

*Example IV*

Raw beef that has not been dried, is cut into pieces about 1¼ inches square and 3¼ inches thick. These meat pieces are placed in a closed chamber and saturated steam is allowed to enter into the chamber so as to build up as quickly as possible a pressure of 215 pounds per square inch at a temperature of about 395° F. The meat pieces are kept in the chamber under these conditions for a period of 1 minute and immediately thereafter the chamber is suddenly opened to the atmosphere so as to result in an instantaneous drop in pressure. The meat pieces are ejected when the chamber is opened.

For various results, instead of using a time period of 1 minute, the meat pieces may be kept in the pressure chamber for a period of 30 seconds or for a period of 2 minutes, for example.

*Example V*

Beef that has been dried in accord with the procedure for making commercial dried beef is cut into cubes of about ½ inch in size and is then superdried by being placed in a pan drier unit (with air blowing through steam coils) at a temperature ranging between about 60° and 120° C. for a period of about 18 to 20 hours. The period of time and the temperature for this superdrying is adjusted so that there results a drier and hard or tough meat piece.

These superdried dried beef pieces are then treated in accord with the procedure described in Example IV at a pressure of 215 pounds per square inch and at a temperature of about 395° F. and with a time period of 1½ minutes.

If a less porous or less spongy piece is desired, the same procedure may be used except that the time period may be reduced to 1 minute or the time period may be even further reduced to 30 seconds, depending upon the type of finished product desired.

*Example VI*

The product produced in Example V at the time period of 1½ minutes, or perhaps for a longer time period as, for example, 2 minutes or 2½ minutes, is powdered or pulverized.

In carrying out the embodiments of this invention, the explosion procedure, further, is of particular importance, in view of the known fact that various animal protein materials are assimilated or digested to a considerably lesser amount in their relatively long boiled or long cooked condition, than they are in their raw or uncooked condition. For instance, it is known that raw meat is soluble in cold water to a relatively considerable extent, whereas boiled meat is soluble to a much lesser degree.

Based upon this characteristic of these animal protein food materials, the explosion procedure is of considerable advantage in that there is eliminated the long cooking procedures heretofore necessary for animal protein foods. By the explosion treatment, as herein described, these animal protein materials can now be produced in an entirely new and relatively quickly cookable condition.

This application is a continuation-in-part of application Serial No. 274,401, filed May 18, 1939, and application Serial No. 229,711, filed September 13, 1938.

What I claim is:

1. A structure disrupted, steam exploded, dehydrated muscle flesh, animal protein piece.

2. Structure disrupted, steam exploded, dehydrated, muscle flesh animal protein food material, said material being in the form of relatively small particles.

3. The method of treating animal protein muscle flesh, said method comprising freezing the flesh to rupture at least some of its cell structure, then drying the flesh to a lower moisture content, then subjecting it to steam at an elevated temperature and pressure and then instantaneously releasing the temperature and pressure to a lower temperature and pressure.

4. The method of treating animal protein muscle flesh, said method comprising cooking the flesh so as to soften it, then drying the flesh to a lower moisture content, then subjecting it to steam at an elevated temperature and pressure and then instantaneously releasing the temperature and pressure to a lower temperature and pressure.

5. The method of treating animal protein muscle flesh, said method comprising drying the flesh, then subjecting it to steam at an elevated temperature and pressure and then instantaneously releasing the temperature and pressure to a lower temperature and pressure.

ALBERT MUSHER.